(12) United States Patent
Xiao et al.

(10) Patent No.: US 9,270,121 B2
(45) Date of Patent: Feb. 23, 2016

(54) CONTROL CIRCUIT FOR CONTROLLING DEVICES TO BOOT SEQUENTIALLY

(71) Applicant: ScienBiziP Consulting (Shen Zhen) Co., Ltd., Shenzhen (CN)

(72) Inventors: Gui-Fu Xiao, Shenzhen (CN); Cheng-Fei Weng, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 375 days.

(21) Appl. No.: 13/906,519

(22) Filed: May 31, 2013

(65) Prior Publication Data

US 2014/0167510 A1 Jun. 19, 2014

(30) Foreign Application Priority Data

Dec. 18, 2012 (CN) .......................... 2012 1 0550733

(51) Int. Cl.
*H02J 4/00* (2006.01)
*G06F 1/24* (2006.01)
*G06F 1/26* (2006.01)

(52) U.S. Cl.
CPC ... *H02J 4/00* (2013.01); *G06F 1/24* (2013.01); *G06F 1/266* (2013.01); *Y10T 307/469* (2013.01)

(58) Field of Classification Search
CPC .......................................................... H02J 4/00
USPC ............................................................. 307/41
See application file for complete search history.

(56) References Cited

U.S. PATENT DOCUMENTS

| | | | | |
|---|---|---|---|---|
| 5,424,903 A | * | 6/1995 | Schreiber | G06F 1/266 307/41 |
| 9,118,186 B2 | * | 8/2015 | Nelson | H02J 3/00 |
| 2012/0179929 A1 | * | 7/2012 | Chen | H02J 4/00 713/330 |

FOREIGN PATENT DOCUMENTS

GB 2440356 A * 1/2008 ............... G06F 1/26

* cited by examiner

*Primary Examiner* — Fritz M Fleming
(74) *Attorney, Agent, or Firm* — Novak Druce Connolly Bove + Quigg LLP

(57) ABSTRACT

A control circuit for booting a number of devices in a certain order includes two delay circuits and three switch circuits, the first switch circuit and the first delay circuit receiving a power good signal and a voltage signal from a power supply unit and thus allowing a first device to boot and the first delay circuit outputting a first delay signal after a set time, to the second switch circuit and the second delay circuit, which repeat the process of the first delay circuit and switch circuit, to boot the remaining devices.

10 Claims, 4 Drawing Sheets

CONTROL CIRCUIT FOR CONTROLLING DEVICES TO BOOT SEQUENTIALLY

BACKGROUND

1. Technical Field

The present disclosure relates to a circuit for controlling a plurality of devices to boot sequentially.

2. Description of Related Art

A reference current of a server system with several devices usually satisfies a working current of each device. However, when the server system is operating, the fact working current is usually less than the reference current, which causes waste of the current.

Therefore, there is need for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
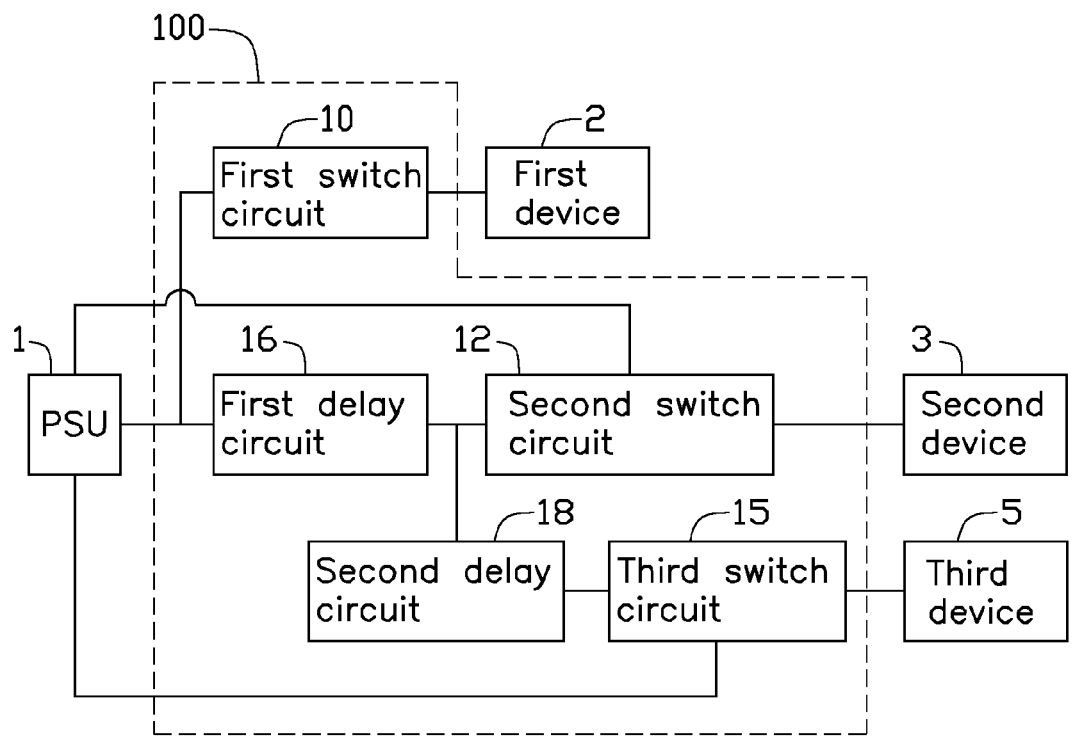
FIG. 1 is a block diagram of an embodiment of a control circuit, wherein the control circuit includes a first switch circuit, a first delay circuit, a second switch circuit, a second delay circuit, and a third switch circuit.

FIG. 1 is a block diagram of an embodiment of a control circuit 100. The control circuit 100 is used in a server. The server includes a power supply unit (PSU) 1, a first device 2, a second device 3, and a third device 5. The PSU 1 provides power to the devices 2-5. The control circuit 100 can be used to boot the devices 2-5 in an orderly manner.

The control circuit 100 includes a first switch circuit 10, a second switch circuit 12, a third switch circuit 15, a first delay circuit 16, and a second delay circuit 18. In the embodiment, the first device 2 is a fan, the second device 3 is a hard disk drive, and the third device 5 is a video card with a peripheral component interconnect express (PCIe) interface, but the disclosure is not limited thereto.

The first switch circuit 10 is connected between the PSU 1 and the first device 2, and receives a power good signal PWRGD_PS and a first voltage P12V from the PSU 1, and the first voltage P12V is transmitted to the first device 2 after receiving the power good signal PWRGD_PS.

The first delay circuit 16 is connected between the PSU 1 and the second switch circuit 12 and receives the power good signal PWRGD_PS, and a first delay signal PWRGD_PS_DLY is output to the second switch circuit 12. The second switch circuit 12 is connected between the PSU 1 and the second device 3 and receives the first voltage P12V from the PSU 1, and outputting the first voltage P12V to the second device 3 after receiving the first delay signal PWRGD_PS_DLY.

The second delay circuit 18 is connected between the first delay circuit 16 and the third switch circuit 15, and receives the first delay signal PWRGD_PS_DLY, and outputs a second delay signal PWRGD_PS_DLY1 to the third switch circuit 15. The third switch circuit 15 is connected between the PSU 1 and the third device 5 and receives the first voltage P12V from the PSU 1, and the first voltage P12V is output to the third device 5 after receiving the second delay signal PWRGD_PS_DLY1.

Figure 2:
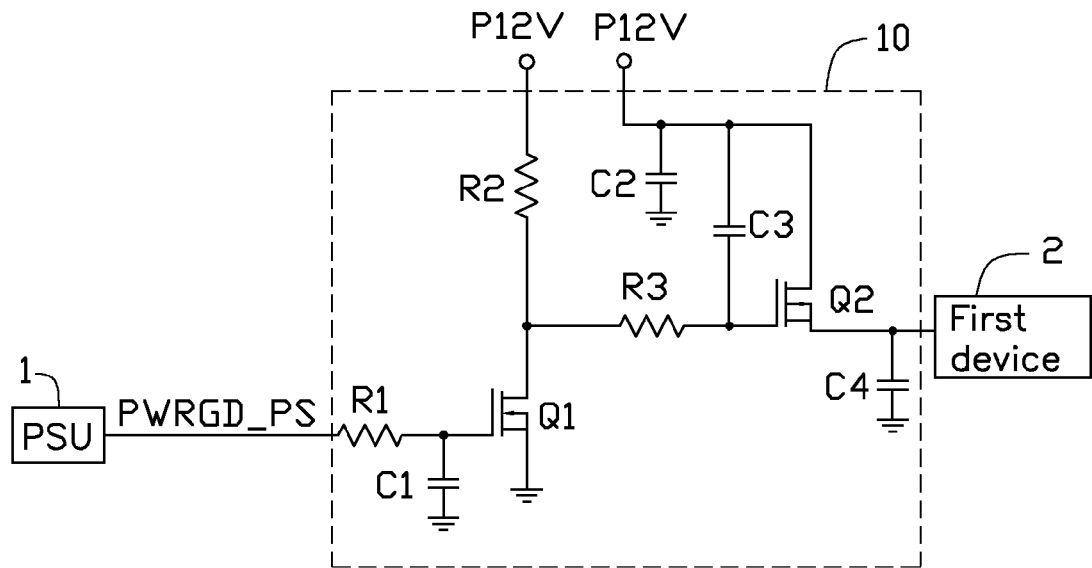
FIG. 2 is a circuit diagram of the first switch circuit of the control circuit of FIG. 1.

In FIG. 2, the first switch circuit 10 includes two electronic switches Q1 and Q2, three resistors R1-R3, and four capacitors C1-C4. A first end of the electronic switch Q1 is connected to the PSU 1 through the resistor R1, and receives the power good signal PWRGD_PS. The first end of the electronic switch Q1 is further grounded through the capacitor C1. A second end of the electronic switch Q1 is connected to a first power terminal P12V of the PSU 1 through the resistor R2, and receives the first voltage P12V. A third end of the electronic switch Q1 is grounded.

A first end of the electronic switch Q2 is connected to the second end of the electronic switch Q1 through the resistor R3, and is connected to the first power terminal P12V of the PSU 1 through the capacitor C3. A second end of the electronic switch Q2 is connected to the first power terminal P12V of the PSU 1, and receives the first voltage P12V, and is grounded through the capacitor C2. A third end of the electronic switch Q2 is connected to the first device 2 and is grounded through the capacitor C4. The capacitors C1-C4 filter noise from the first switch circuit 10.

Figure 3:
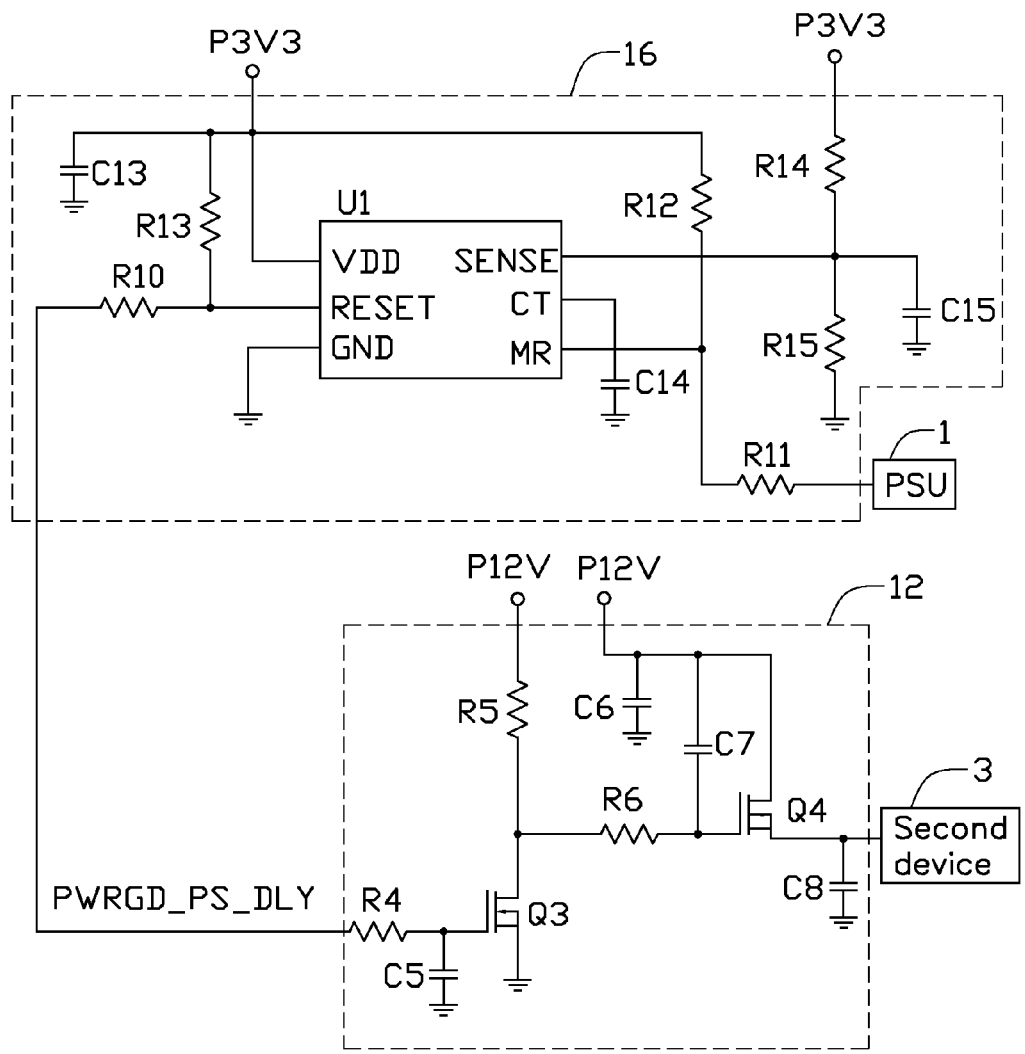
FIG. 3 is circuit diagrams of the first delay circuit and the second switch circuit control circuit of FIG. 1.

In FIG. 3, the first delay circuit 16 includes a first delay chip U1, six resistors R10-R15, and three capacitors C13-C15. A reset pin RESET of the first delay chip U1 is connected to the second switch circuit 12 through the resistor R10, and outputs the first delay signal PWRGD_PS_DLY to the second switch circuit 12. The reset pin RESET of the first delay chip U1 is also connected to a second power terminal P3V3 of the PSU 1 through the resistor R13, and is grounded through the resistor R13 and the capacitor C13 in series. A ground pin GND of the first delay chip U1 is grounded. A manual reset pin MR of the first delay chip U1 is connected to the PSU 1 through the resistor R11, and receives the power good signal PWRGD_PS. The manual reset pin MR of the first delay chip U1 is also connected to the second power terminal P3V3 of the PSU 1 through the resistor R12, and receives a second voltage P3V3. A set pin CT of the first delay chip U1 is grounded through the capacitor C14. A sense pin SENSE of the first delay chip U1 is grounded through the capacitor C15. The second power terminal P3V3 of the PSU 1 is grounded through the resistors R14 and R15 in series. A node between the resistors R14 and R15 is connected to the sense pin SENSE of the first delay chip U1.

The second switch circuit 12 includes two electronic switches Q3 and Q4, three resistors R4-R6, and four capacitors C5-C8. A first end of the electronic switch Q3 is connected to the first delay circuit 16 through the resistor R4 and receives the first delay signal PWRGD_PS_DLY. The first end of the electronic switch Q3 is also grounded through the capacitor C5. A second end of the electronic switch Q3 is connected to the first power terminal P12V of the PSU 1 through the resistor R5, and receives the first voltage P12V. A third end of the electronic switch Q3 is grounded.

A first end of the electronic switch Q4 is connected to the second end of the electronic switch Q3 through the resistor R6, and is connected to the first power terminal P12V of the PSU 1 through the capacitor C7. A second end of the electronic switch Q4 is connected to the first power terminal P12V of the PSU 1, and receives the first voltage P12V, and is grounded through the capacitor C6. A third end of the electronic switch Q4 is connected to the second device 3 and is grounded through the capacitor C8. The capacitors C5-C8 filter noise from the second switch circuit 12.

Figure 4:
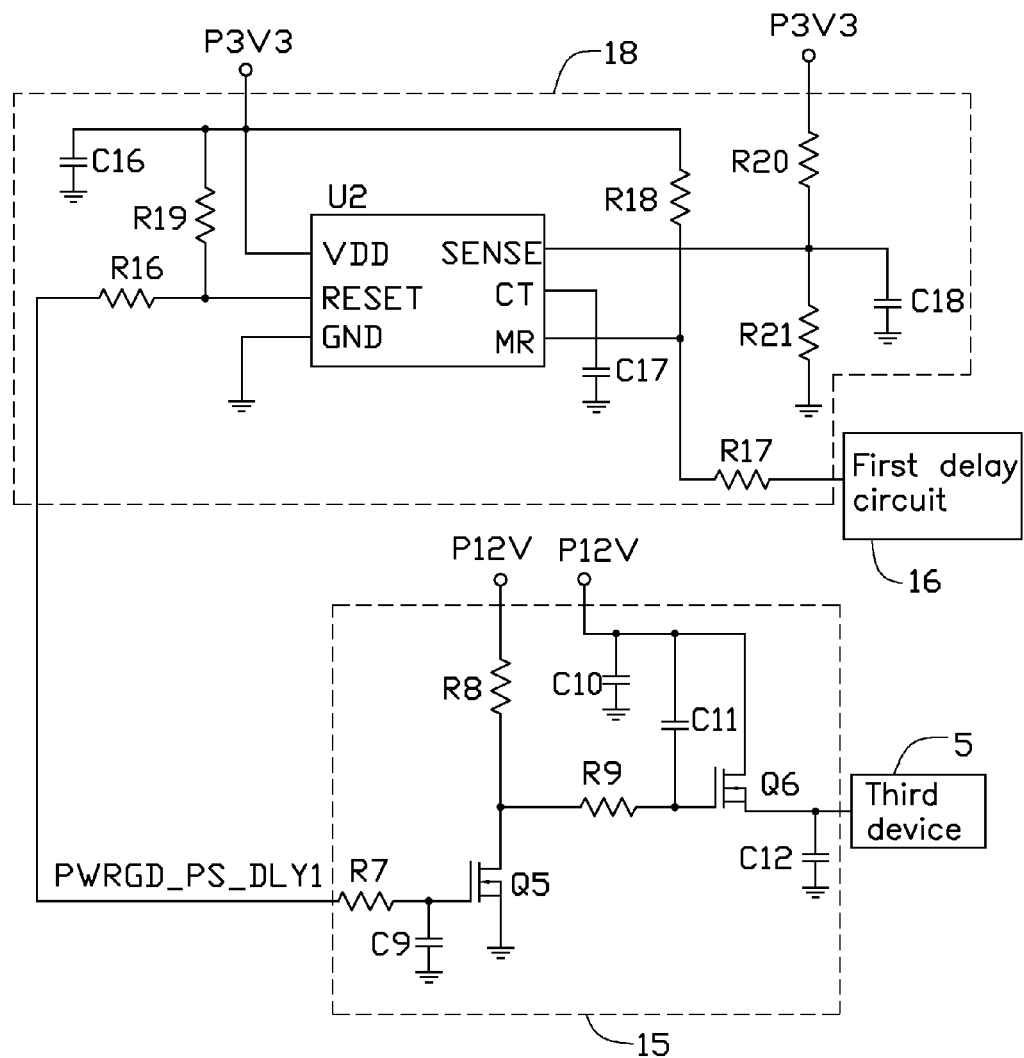
FIG. 4 is circuit diagrams of the second delay circuit and the third switch circuit control circuit of FIG. 1.

In FIG. 4, the second delay circuit 18 includes a second delay chip U2, six resistors R16-R21, and three capacitors C16-C18. A reset pin RESET of the second delay chip U2 is connected to the third switch circuit 15 through the resistor R16, and outputs the second delay signal PWRGD_PS_DLY1 to the third switch circuit 15. The reset pin RESET of the second delay chip U2 is also connected to the second power terminal P3V3 of the PSU 1 through the resistor R19, and is grounded through the resistor R19 and the capacitor C16 in series. A ground pin GND of the second delay chip U2 is grounded. A manual reset pin MR of the second delay chip U2 is connected to the first delay circuit 16 through the resistor R17, and receives the first delay signal PWRGD_PS_DLY. The manual reset pin MR of the second delay chip U2 is also connected to the second power terminal P3V3 of the PSU 1 through the resistor R18, and receives the second voltage P3V3. A set pin CT of the second delay chip U2 is grounded through the capacitor C17. A sense pin SENSE of the second delay chip U2 is grounded through the capacitor C18. The second power terminal P3V3 of the PSU 1 is grounded through the resistors R20 and R21 in series. A node between the resistors R20 and R21 is connected to the sense pin SENSE of the second delay chip U2.

The third switch circuit 15 includes two electronic switches Q5 and Q6, three resistors R7-R9, and four capacitors C9-C12. A first end of the electronic switch Q5 is connected to the second delay circuit 18 through the resistor R7, and receives the second delay signal PWRGD_PS_DLY1. The first end of the electronic switch Q5 is also grounded through the capacitor C9. A second end of the electronic switch Q5 is connected to the first power terminal P12V of the PSU 1 through the resistor R8, and receives the first voltage P12V. A third end of the electronic switch Q5 is grounded.

A first end of the electronic switch Q6 is connected to the second end of the electronic switch Q5 through the resistor R9, and is connected to the first power terminal P12V of the PSU 1 through the capacitor C11. A second end of the electronic switch Q6 is connected to the first power terminal P12V of the PSU 1, and receives the first voltage P12V, and is grounded through the capacitor C10. A third end of the electronic switch Q6 is connected to the third device 5, and is grounded through the capacitor C12. The capacitors C9-C12 filter noise from the third switch circuit 15.

In use, the PSU 1 outputs the power good signal PWRGD_PS to the first switch circuit 10 and the first delay circuit 16. When the first switch circuit 10 receives the power good signal PWRGD_PS, the electronic switches Q1 and Q2 are turned on. Therefore, the first voltage P12V of the PSU 1 is outputted to the first device 2 for booting the first device 2.

When the first delay circuit 16 receives the power good signal PWRGD P_S, the reset pin RESET of the first delay chip U1 outputs the first delay signal PWRGD_PS_DLY to the second switch circuit 12 and the second delay circuit 18 after a first delay time set beforehand in the first delay chip U1. When the second switch circuit 12 receives the first delay signal PWRGD_PS_DLY, the electronic switches Q3 and Q4 are turned on. Therefore, the first voltage P12V of the PSU 1 is outputted to the second device 3 for booting the second device 3.

When the second delay circuit 18 receives the first delay signal PWRGD_PS_DLY, the reset pin RESET of the second delay chip U2 outputs the second delay signal PWRGD_PS_DLY1 to the third switch circuit 15 after a second delay time set beforehand in the second delay chip U2.

The electronic switches Q5 and Q6 are turned on. The first voltage P12V of the PSU 1 is outputted to the third device 5 for booting the third device 5.

In the embodiment, the electronic switches Q1-Q6 are metal oxide semiconductor field-effect transistors (MOSFETs). The electronic switches Q1, Q3, and Q5 are n-channel MOSFETs. The electronic switches Q2, Q4, and Q6 are p-channel MOSFETs. The first, second, and third ends of each electronic switch respectively correspond to a gate, a drain, and a source of each MOSFET.

While the disclosure has been described by way of example and in terms of preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A control circuit, comprising:
a first switch circuit comprising a first electronic switch and a second electronic switch, wherein a first end of the first electronic switch is connected to a power supply unit (PSU) and receives a power good signal outputted from the PSU, a second end of the first electronic switch is connected to a first power terminal of the PSU and receives a first voltage outputted from the PSU, a third end of the first electronic is grounded, the second end of the first electronic switch is connected to a first end of the second electronic, a second end of the second electronic switch is connected to the first power terminal and receives the first voltage, a third end of the second electronic switch is connected to a first one of the plurality of devices; wherein when the first electronic switch receives the power good signal, the first and second electronic switches are turned on and the first voltage is transmitted to the first device;
a first delay circuit connected to the PSU, the first delay circuit receiving the power good signal, and outputting a first delay signal after a first delay time; and
a second switch circuit comprising a third electronic switch and a fourth electronic switch, wherein a first end of the third electronic switch is connected to the first delay circuit and receives the first delay signal, a second end of the third electronic switch is connected to the first power terminal of the PSU and receives the first voltage, a third end of the third electronic switch is grounded, the second end of the third electronic switch is connected to a first end of the fourth electronic switch, a second end of the fourth electronic switch is connected to the first power terminal and receives the first voltage, a third end of the fourth electronic switch is connected to a second one of the plurality of devices; wherein when the third electronic switch receives the first delay signal, the third and fourth electronic switches are turned on, the first voltage is outputted to the second device.

2. The control circuit of claim 1, wherein the first end of the first electronic switch is grounded through a first capacitor, the second end of the first electronic switch is connected to the first end of the second electronic switch through a first resistor, and is connected to the first power terminal through a second resistor, the first end of the second electronic switch is connected to the first power terminal through a second capacitor, the third end of the second electronic switch is grounded through a third capacitor, the first power terminal is grounded through a fourth capacitor.

3. The control circuit of claim 1, wherein the first end of the third electronic switch is grounded through a fifth capacitor, the second end of the third electronic switch is connected to the first end of the fourth electronic switch through a third resistor, and is connected to the first power terminal through a fourth resistor, the first end of the fourth electronic switch is connected to the first power terminal through a sixth capacitor, the third end of the fourth electronic switch is grounded through a seventh capacitor, the first power terminal is grounded through an eighth capacitor.

4. The control circuit of claim 1, wherein the first delay circuit comprises a first delay chip, a reset pin of the first delay chip is connected to the second switch circuit through a fifth resistor, and connected to a second power terminal of the PSU through a sixth resistor to receive a second voltage, a ground pin of the first delay chip is grounded, a manual reset pin of the first delay chip is connected to the PSU through a seventh resistor and receives the power good signal, and connected to the second power terminal of the PSU through an eighth resistor to receive the second voltage, the second power terminal of the PSU is grounded through a ninth resistor and a tenth resistor connected in series, a sense pin of the first delay chip is connected to a node between the ninth resistor and the tenth resistor.

5. The control circuit of claim 4, wherein the sense pin of the first delay chip is also grounded through a ninth capacitor, a set pin of the first delay chip is grounded through a tenth capacitor, the second power terminal of the PSU is grounded through an eleventh capacitor.

6. The control circuit of claim 5, wherein the first to fourth electronic switches are metal oxide semiconductor field-effect transistors (MOSFETs), the first to third ends of each electronic switch corresponding to a gate, a drain, and a source, respectively of the MOSFET.

7. The control circuit of claim 1, further comprising a second delay circuit and a third switch circuit, wherein the second delay circuit is connected between the first delay circuit and the third switch circuit, and outputs a second delay signal to the third switch circuit after receiving the first delay signal from the first delay circuit, the third switch circuit comprises a fifth electronic switch and a sixth electronic switch, a first end of the fifth electronic switch is connected to the second delay circuit and receives the second delay signal, a second end of the fifth electronic switch is connected to the first power terminal of the PSU and receives the first voltage, a third end of the fifth electronic switch is grounded, the second end of the fifth electronic switch is connected to the first end of the sixth electronic switch, a second end of the sixth electronic switch is connected to the first power terminal of the PSU and receives the first voltage, a third end of the sixth electronic switch is connected to a third one of the plurality of devices; wherein when the fifth electronic switch receives the second delay signal, the fifth and sixth electronic switches are turned on, the first voltage is transmitted to the third device.

8. The control circuit of claim 7, wherein the first end of the fifth electronic switch is grounded through a twelfth capacitor, the second end of the first electronic switch is connected to the first end of the sixth electronic switch through an eleventh resistor, and is connected to the first power terminal through a twelfth resistor, the first end of the sixth electronic switch is connected to the first power terminal through a thirteenth capacitor, the third end of the sixth electronic switch is grounded through a fourteenth capacitor.

9. The control circuit of claim 7, wherein the second delay circuit comprises a second delay chip, a reset pin of the second delay chip is connected to the third switch circuit through a thirteenth resistor, and is connected to the second power terminal of the PSU through a fourteenth resistor, a ground pin of the second delay chip is grounded, a manual reset pin of the second delay chip is connected to the first delay circuit through a fifteenth resistor and receives the first delay signal, and is connected to the second power terminal through a sixteenth resistor, the second power terminal of the PSU is grounded through a seventeenth resistor and an eighteenth resistor connected in series, a sense pin of the second delay chip is connected to a node between the seventeenth resistor and the eighteenth resistor.

10. The control circuit of claim 9, wherein the sense pin of the second delay chip is also grounded through a fifteenth capacitor, a set pin of the second delay chip is grounded through a sixteenth capacitor, the second power terminal of the PSU is grounded through a seventeenth capacitor.

\* \* \* \* \*